United States Patent [19]
Yoaz et al.

[11] Patent Number: 5,987,595
[45] Date of Patent: Nov. 16, 1999

[54] METHOD AND APPARATUS FOR PREDICTING WHEN LOAD INSTRUCTIONS CAN BE EXECUTED OUT-OF ORDER

[75] Inventors: Adi Yoaz, Talmy-Menache; Ronny Ronen, Haifa; Robert C. Valentine, Qiryat Tivon, all of Israel

[73] Assignee: Intel Corporation, Santa Clara, Calif.

[21] Appl. No.: 08/977,546

[22] Filed: Nov. 25, 1997

[51] Int. Cl.⁶ .................................................. G06F 9/312

[52] U.S. Cl. .................... 712/216; 712/217; 712/218; 712/219; 712/233; 712/241

[58] Field of Search ................... 395/392, 580, 395/393, 394, 395, 588; 712/216, 217, 218, 219, 233, 241

[56] References Cited

U.S. PATENT DOCUMENTS

| | | | |
|---|---|---|---|
| 5,261,071 | 11/1993 | Lyon | 395/425 |
| 5,526,499 | 6/1996 | Bernstein et al. | 395/376 |
| 5,584,001 | 12/1996 | Hoyt et al. | 395/585 |
| 5,606,670 | 2/1997 | Abramson et al. | 395/250 |
| 5,615,350 | 3/1997 | Hesson et al. | 395/394 |
| 5,666,506 | 9/1997 | Heson et al. | 395/392 |
| 5,784,586 | 7/1998 | Simone et al. | 395/392 |
| 5,802,588 | 9/1998 | Ramagopal et al. | 711/156 |
| 5,809,275 | 9/1998 | Lesartre | 395/392 |
| 5,835,747 | 11/1998 | Trull | 395/392 |

OTHER PUBLICATIONS

V. Popescu, M. Schultz, J. Spracklen, G. Givson, B. Lightner, D. Isaman; "The Metaflow Architecture" (Jun. 1991 IEEE Micro) pp. 10–13, 63–73.

*Primary Examiner*—Zarni Maung
*Assistant Examiner*—Saleh Najjar
*Attorney, Agent, or Firm*—Blakely, Sokoloff, Taylor & Zafman

[57] ABSTRACT

The invention in several embodiments includes an apparatus and a method for predicting whether store instructions can be safely executed out-of-order. The apparatus, includes at least one execution unit, a reorder buffer adapted to holding a plurality of instructions from an instruction sequence for execution by the execution units, and a memory storage device adapted to holding a collision history table. The collision history table has entries for load instructions of the instruction sequence Each of the entries is adapted to predicting when the associated load instruction is colliding.

28 Claims, 6 Drawing Sheets

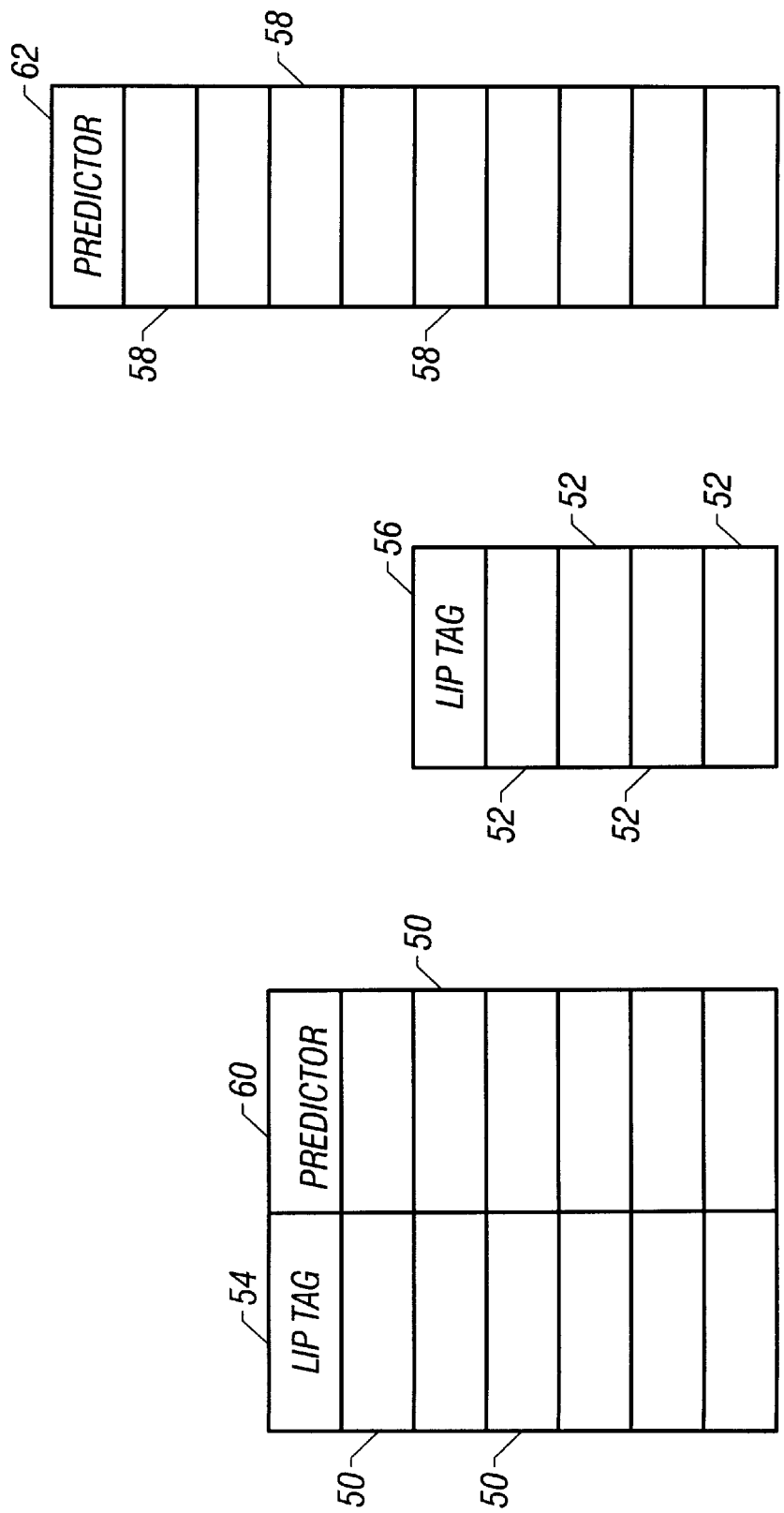

FIG. 2F TAGLESS CHT
FIG. 2E IMPLICIT-PRED CHT
FIG. 2D FULL CHT

METHOD AND APPARATUS FOR PREDICTING WHEN LOAD INSTRUCTIONS CAN BE EXECUTED OUT-OF ORDER

BACKGROUND OF THE INVENTION

1. Field of the Invention

This invention relates generally to processors and computers, and, more particularly, to a method and apparatus for predicting when a load instruction can be executed out-of order before a prior store instruction.

2. Description of the Related Art

Some processors are referred to as out-of-order processors, because these processors do not execute all instructions in the order of the original instruction sequence. A first type of out-of-order processor employs out-of-order execution to improve the performance of a single execution unit, for example to keep the execution unit operating during delays associated with caches retrieving data from the main memory. A second type of processor has multiple execution units and uses out-of-order methods to enhance performance by keeping these execution units operating concurrently much of the time. Flexible instruction execution in out-of-order processors may improve the overall performance.

FIG. 1 illustrates a simple out-of-order processor 2. An instruction fetcher and decoder 4 continually fetches and decodes instructions from a memory 6. The decoded instructions are transferred to a reorder buffer 8 in an order that preserves the original instruction sequence. The reorder buffer 8 is a memory device that is organized like a table. Each occupied entry 9, 10, 11, 12, 13, 14 of the reorder buffer 8 contains an instruction label 16, a memory address or instruction pointer (IP) 18 for the instruction, one or more status bits 20, and a result location 21 for execution results. The reorder buffer 8 has a circular organization with pointers 22, 24 directed to the oldest and newest instructions 14, 9 transferred therein, respectfully. A controller 26 sends instructions from the reorder buffer 8 to execution units 28, 30, 32. The controller 26 checks the status bits 20 of the entries 9, 10, 11, 12, 13, 14 to determine which instructions are unexecuted, i.e. status bits indicate "undone." Then, the controller 26 sends unexecuted instructions 9, 10, 12 to the execution units 28, 30, 32. Preferably, the fetcher and decoder 4 tries to keep the reorder buffer 8 full, and preferably, the controller 26 tries to execute instructions in the reorder buffer 8 as fast as possible by using the possibility of executing instructions out-of-the-order of the original instruction sequence. After an instruction is executed, the controller 26 stores the execution results to the result location 21 associated with the executed instruction 11, 14 and changes the status bit 20 to "done." A retirement unit 34 periodically reads the status bits 20 of the entries 9, 10, 11, 12, 13, 14 of the reorder buffer 16 and retires executed or "done" instructions, 14 by sending the results to memory or registers 36. The retirement unit 34 retires the executed instructions 11, 14 in an order that strictly follows the original instruction sequence.

Referring to FIG. 1, the processor 2 preferably still executes a dependent instruction, e.g., the load entry 11, only after completing the execution of the instruction on which the dependent instruction depends, e.g., the store entry 12. Load instructions, such as the load instruction 9, that load data from an address that is not the address that data is stored to by an earlier store instruction, concurrently in the reorder buffer 8, are independent and may be executed in advance of their position in the instruction order. In the prior art, the retirement unit 34 checked additional status bits 20, indexing dependencies before retiring executed instructions. If the status bits 20 indicated that the dependent instruction was executed before the instruction on which it depended, as illustrated by the load and store entries 11, 12 of FIG. 1, the retirement unit 34 flushed the execution results of the dependent instruction from the reorder buffer 8 and reset the status bits 20 of the dependent instruction for re-execution, i.e. the entry 11 for the load instruction in FIG. 1. These flushes and re-executions slowed processor operation. Of course, not advancing the execution of any instructions out-of-order may also slow the processor by introducing clock periods during which instructions are not executed.

Referring to FIG. 1, the entry 11 for the load instruction cannot be safely executed before the entry 12 for the store instruction, because the store instruction is earlier in the instruction sequence and stores data to the address from which the load instruction loads data. Such store and load instructions are generically known as colliding load and store instructions. Though the entries 11, 12 are clearly colliding at the time illustrated in FIG. 1, the processor 2 often does not know that a generic store instruction will collide with a subsequent load instruction when the controller 26 wants to send the load instruction for execution. In such cases, executing the load instruction first is risky, because the processor may subsequently learn that the load is colliding and have to make a costly flush of the reorder buffer 8. Techniques that predict colliding store instructions may help avoid costly flushes while still allowing the advancement of the execution of load instructions.

The prior art has used deterministic techniques to determine when a store instruction will store data to the same address as a subsequent load instruction, i.e. collide with the load. Software and hardware techniques have enabled advancing the execution of loads before earlier stores when the associated data addresses could be determined with certainty. Nevertheless, experience indicates many other load instructions may be safely executed before earlier stores in the instruction sequence even though the absence of a collision cannot be guaranteed with certainty.

The prior art also contains other techniques for speculative advancement of the execution of load instructions. In speculative advancement, the load instructions are provisionally executed before earlier store instructions when it is probable that the load and store instructions involve different data addresses, i.e. are probably not colliding. In one prior art method, the load instruction is marked provisional after being executed before an earlier store instruction. The method stores a verification instruction at the original data address of the provisionally executed load instruction. The data address is checked for modification before retirement of the load instruction from the reorder buffer 14. Purely hardware devices have also been used to speculatively predict colliding store and load pairs. A load predicted to be colliding is either not advanced before the store member of the pair, or data from the store instruction is forwarded so that the load instruction can be safely executed in advance. The prediction of colliding store and load instruction pairs is complicated and may involve substantial processor resources. Furthermore, these prior art techniques miss some load instructions that can be safely executed earlier, and opportunities for faster processor operation are lost.

The present invention is directed to overcoming, or at least reducing the effects of, one or more of the problems set forth above.

SUMMARY OF THE INVENTION

The invention in several embodiments includes an apparatus and method for executing instructions in a processor.

The apparatus, includes at least one execution unit, a reorder buffer adapted to holding a plurality of instructions from an instruction sequence for execution by the execution units, and a memory storage device adapted to holding a collision history table. The collision history table has entries for load instructions of the instruction sequence.

BRIEF DESCRIPTION OF THE DRAWINGS

Other objects and advantages of the invention will become apparent upon reading the following detailed description and upon reference to the drawings in which:

FIGS. 2A–F illustrate several embodiments for the collision history table;

Figure 1:
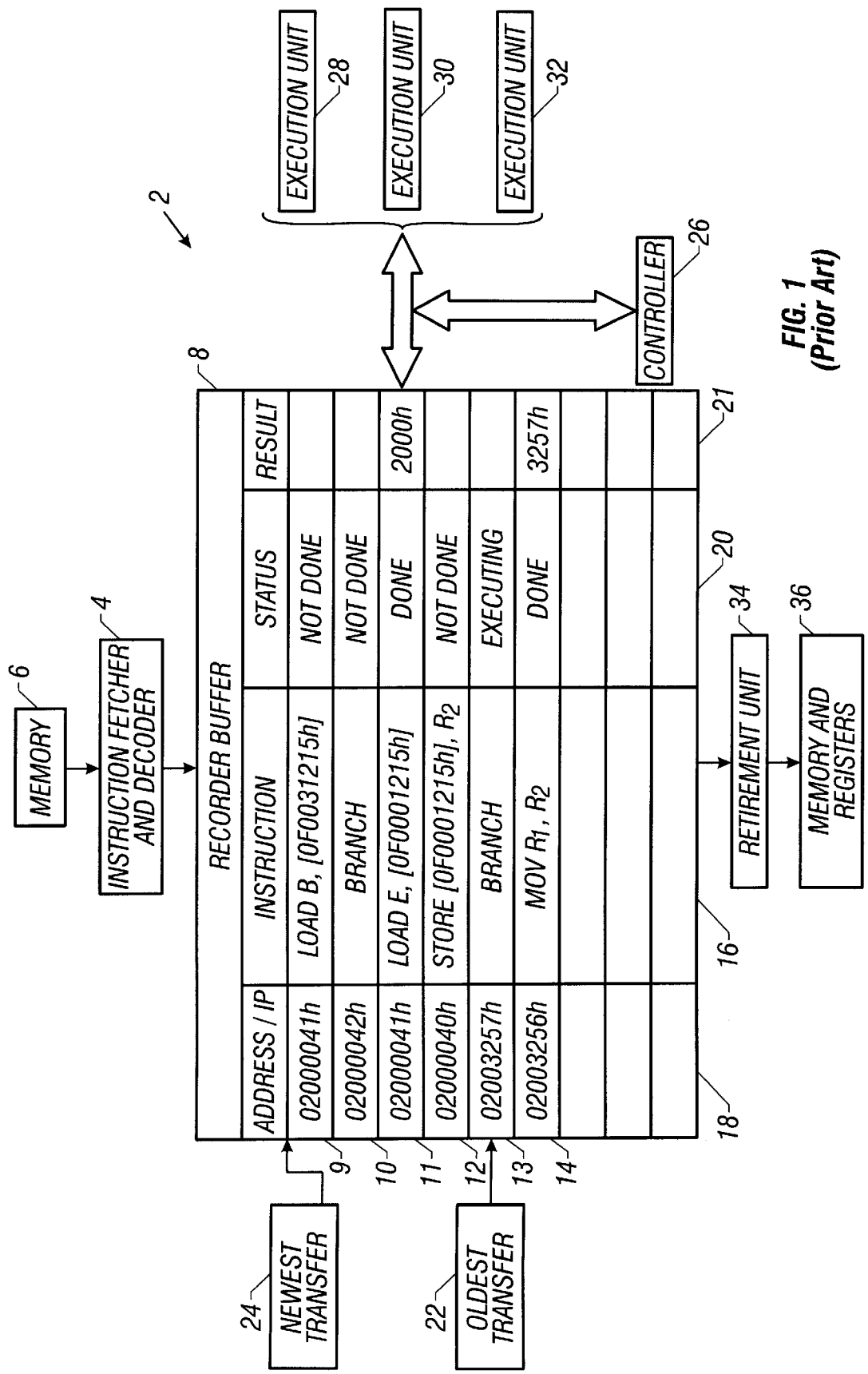
FIG. 1 illustrates a prior art out-of-order processor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A collision history table (CHT) is a memory storage device having a lookup table for making predictions about load instructions from an instruction sequence. An entry of the CHT predicts whether the load instruction associated with the entry will "collide." The load instruction is predicted as colliding when the load instruction, at some earlier time, was executed in advance of at least one store instruction earlier in the instruction sequence, was simultaneously in a reorder buffer with the store instruction, and loaded data from the same address that the store instruction stored data to at the earlier time. Some embodiments of the CHT also predict that a load instruction is colliding if the load instruction was, at some time in the past, found to be potentially colliding. A load instruction is termed potentially colliding if the load instruction would have collided had it been executed in advance of a store instruction, at some time in the past, but the load instruction was not executed ahead of the store instruction.

FIGS. 2A–F illustrate several embodiments of a collision history table (CHT) 38, 40, 42, 44, 46, 48. A CHT 38, 40, 42, 44, 46, 48 may have a variety of organizations and may use a variety of lookup and refreshment methods that are well known in the art of cache memories. For example, the CHT's 38, 40 have entries 50, 52 that are indexed by a tag 54, 56. The tag 54, 56 is searched when looking up a load instruction in the respective CHT 38, 40. In one embodiment, the tag 54, 56 is the linear instruction pointer (LIP) for the load instruction. The entries 50, 52 of the full and implicit predictor CHT's 38, 40 may be organized like entries of an n-way associative cache memory (not shown). In some embodiments, the CHT 42 is tagless and is like a direct-mapped cache memory. In the tagless CHT 42, each entry is indexed by a subset of the bits of the linear instruction pointer of the entry. The position of the entry 58 in the tagless CHT 42 also ordinarily contains information such as the instruction's position on a page of the memory (not shown), i.e. information from the remaining bits of the linear instruction pointer.

Referring to FIGS. 2A–F, different embodiments of the CHT 38, 40, 42 represent predictions for load instructions in different ways. In the implicit-predictor CHT 40, all entries 52 in the CHT implicitly correspond to load instructions predicted to be colliding. In the full and tagless CHT's 38, 42 each entry has a respective predictor 60, 62. The predictor 60, 62 is a bit that may be in a first or a second state. If the predictor bit 60, 62 is in the first state, the corresponding load instruction is predicted to be colliding. If the predictor bit 60, 62 is in the second state, the corresponding load instruction is predicted to not be colliding. In other embodiments, such as shown in FIGS. 2D–F, the CHT 44, 46, 48, entries may have additional bits 64, 66, 68 corresponding to distances. The distance bits 64, 66, 68 predict the distance, i.e. the number of instructions, that the execution of the load instruction associated with the entry can be advanced without the execution occurring before an earlier store instruction having the same data address. Generally, each embodiment of the CHT 38, 40, 42, 44, 46, 48 only makes predictions about colliding load and store instructions for load and store instructions that are simultaneously in a reorder buffer (see below).

The predictor and distance bits may take any of a variety of forms, including the predictor bits being sticky bits or saturating counters. The sticky bit cannot be reset to the second state after it has been set to the first state. With a sticky bit, once a load instruction is predicted to be colliding, the prediction is not updated. Since each entry 58 of the tagless CHT 42 corresponds to several load instructions, collision probabilities of entries may change substantially in time, and the sticky bit that cannot be updated is ordinarily not the appropriate predictor 62 for the tagless CHT 42. The saturating counter is similar to the sticky bit except that a subsequent update may return the counter to the second state. The distance bits 64, 66, 68 predict how far a load instruction can be advanced in the execution sequence and may take a variety of forms. In a first embodiment, the distance bits measure the number of earlier store instructions that the execution of the load instruction may precede. In a second embodiment, the distance bits measure the number of earlier instructions, of all types, that the execution of the load instruction may precede. In some embodiments, there may be enough distance bits to distinguish all distances between instructions in the reorder buffer 94. The distance bits 64, 66, 68 give a refined prediction for when load instructions are not colliding. Load instructions not executed more than the distance represented by the distance bits in advance of the location of the load instruction in the instruction sequence are predicted to not be colliding. In one embodiment, the distance bits are updated to predict a shortest distance that the execution of the load instruction can be advanced without leading to a collision. The construction and use of predictor and distance bits is routine to a person of ordinary skill in the art having the knowledge of this disclosure.

Figure 3:
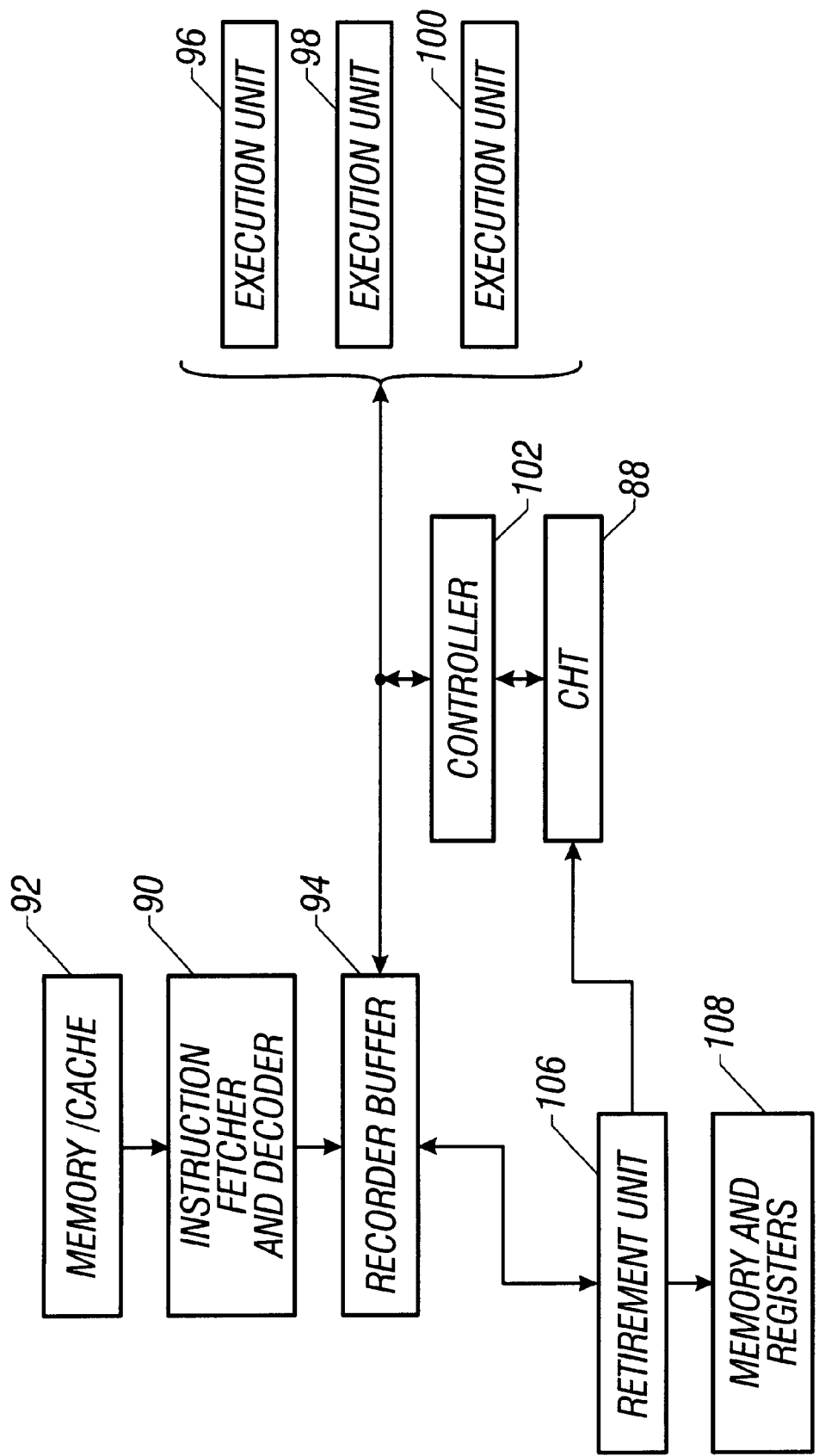
FIG. 3 illustrates a specific processor that uses a collision history table to perform the out-of-order execution of load instructions.

FIG. 3 illustrates one embodiment 86 for using a CHT 88 in combination with other structures of a processor (not shown). An instruction fetcher and decoder 90 reads and consecutively decodes instructions from a memory or cache 92. The instructions are delivered to a reorder buffer 94 in an instruction sequence. The instruction sequence from the fetcher and decoder 90 strictly follows the order of instructions in the memory 92. But, the instruction sequence in some embodiments of the processor speculatively incorporate the effect of jumps on the instruction sequence to account for branch instructions. In other words, the order of the instruction sequence from the fetcher and decoder 90 is the order in which the processor assumes the instruction sequence will proceed, assuming that branches have been properly predicted. In one embodiment, the original instruction sequence is recorded in the reorder buffer 94 by known techniques and hardware. Instructions in the reorder buffer 94 may be sent to a plurality of execution units 96, 98, 100 for out-of-order execution. A controller 102 sends instructions from the reorder buffer 94 to the execution units 96, 98, 100 after looking up the load instruction in the CHT 88. The controller 102 sends a load instruction for execution if the CHT 88 does not predict that the load instruction is colliding. Typically, the controller 102 restores results from executed instructions to a part of the entry (not shown) for the instruction in the reorder buffer 94. A retirement unit 106 retires executed instructions from the reorder buffer 94 and writes the results to memory or registers 108. The retirement unit 106 ordinarily retires instructions from the reorder buffer 94 in an order that strictly follows the original instruction sequence.

Figure 4:
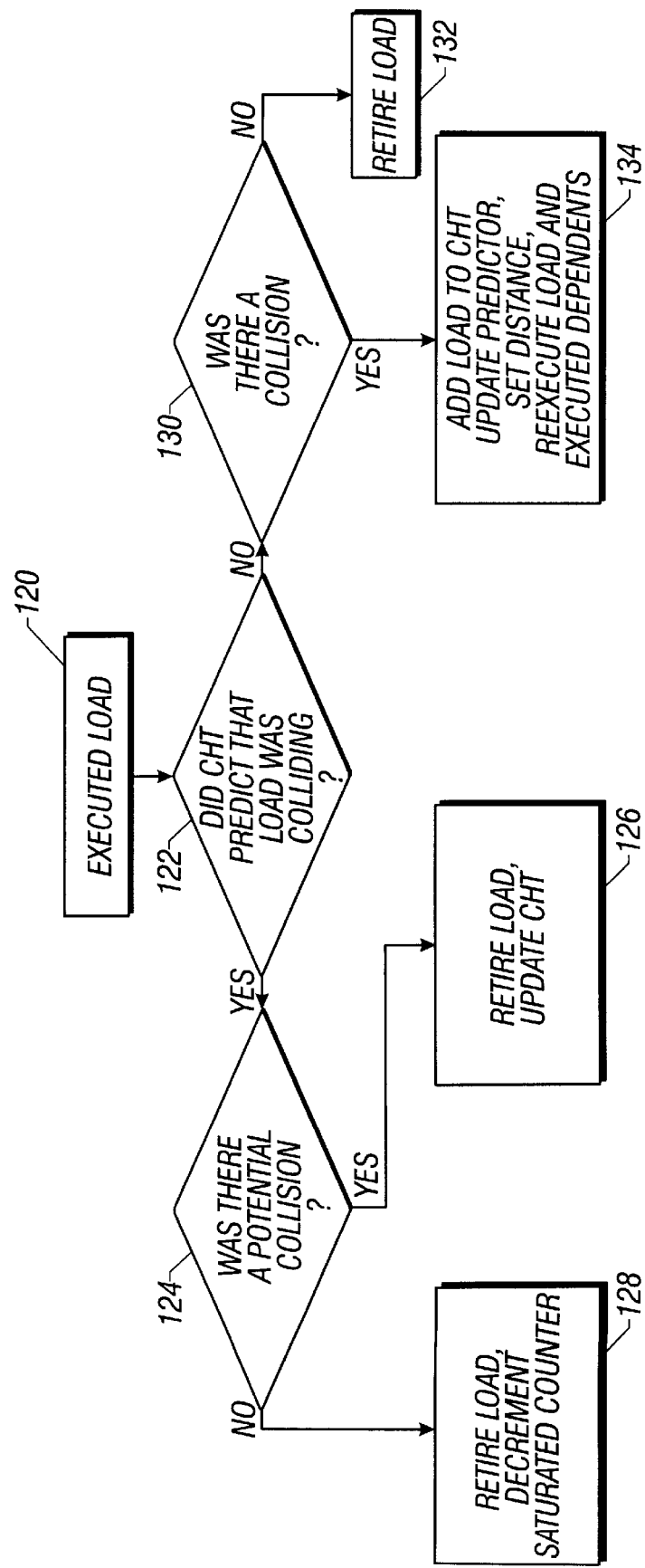
FIG. 4 illustrates a specific method for updating the collision history table when retiring an executed load instruction.

FIG. 4 is a flowchart of the steps of a method 119 for retiring an executed load instruction from the reorder buffer 94. The method begins at block 120 with a load instruction ready to be retired, e.g., the load has been executed and is among the oldest instructions in the reorder buffer 94. At decision block 122, the retirement unit 106 checks whether the CHT 88 presently predicts that the load is colliding. If the CHT 88 predicts that the load is colliding, control transfers to decision block 124. It should be noted that, the controller 102 would not have actually advanced the execution of the load instruction in this case. The analysis of blocks 124, 126 and 128 concerns whether there was a "potential" for a collision if the load instruction had been advanced. At block 124, the retirement unit 106 checks the dependency bits (discussed below) in the reorder buffer 94 to see whether there was a "potential" for a collision if the load had been advanced, i.e. whether an earlier store actually had the same data address as the load. If advancement of the execution of the load would have resulted in a collision, control is transferred to block 126, and the retirement unit 106 updates the entry for the load instruction in the CHT 88 and retires the load instruction. After the update, the CHT 88 predicts that the load instruction is colliding. For the different embodiments of the CHT 88, as described and shown in FIG. 2, the update may involve adding the load instruction to the CHT 38, 40, 42, 44, 46, 48, changing the state of the predictor bit 38, 42, 44, 48, and/or changing distance bits of the entry 44, 46, 48 for the load. If advancing the execution of the load would not have resulted in a collision, control is transferred to a block 128. In some embodiments, the retirement unit 106 may still have to update the CHT 88 for this case, e.g., decrement a counter, if saturated counters are used for the predictor bit. After updating the CHT 88, the retirement unit 106 retires the executed load instruction from the reorder buffer 94 and writes the result of the load to one or more registers 108. This leaves space for the fetcher and decoder 90 to add another instruction to the reorder buffer 94.

If the CHT 88 does not predict that the load instruction is colliding, control transfers to a block 130 where the retirement unit 106 checks the dependency bits (discussed below) of the reorder buffer 94 to see whether there was, in fact, a collision. If no collision actually occurred, control transfers to a block 132 where the retirement unit 106 simply retires the load instruction from the reorder buffer 94 and writes the result of the load instruction to one or more registers 106. If the status bits show that a collision occurred, control transfers to a block 134 where the retirement unit 106 updates the CHT 88 and sets the load instruction and executed instructions dependent on the load for re-execution. For the different embodiments of the CHT 88 shown and described in FIGS. 2A–F, the update may involve adding the load instruction to the CHT 38, 40, 42, 44, 46, 48 if the entry is not already there, changing the state of the predictor bits 60, 62 and/or changing the distance bits 64, 66, 68 of the entry for the CHT's 38, 40, 42, 46, 44, 48. After the retirement unit 106 has retired one or a group of load instructions and updated the CHT 88, the retirement unit 106 searches the reorder buffer 94 for other instructions ready to be retired.

Figure 5:
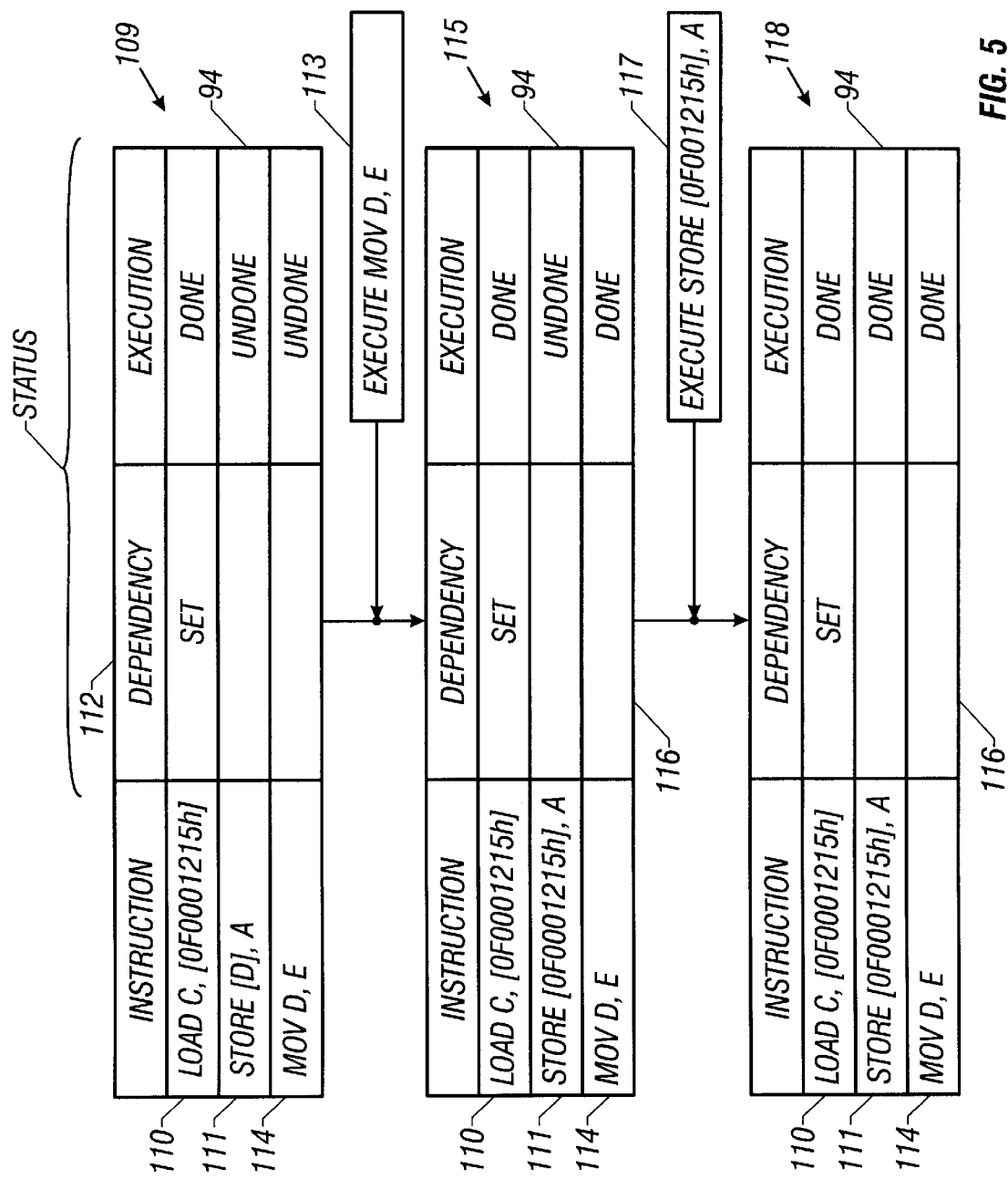
FIG. 5 illustrates a specific method of using status bits to indicate when dependent instructions were performed before instructions on which they depend.

FIG. 5 is a chart illustrating one method for determining, at blocks 124 and 130 of FIG. 4, whether a collision actually occurred or would have potentially occurred. Block 109 of FIG. 5 illustrates the reorder buffer 94 at an initial time. The reorder buffer 94 has entries for a load instruction 110, a store instruction 111, and a register move instruction 114. At block 109, there is not a deterministic dependence between the load and store instructions 110, 111, because the address presently stored in register D, e.g., the data address of the store instruction 111, is not the data address of the load instruction 110. At block 109, the load instruction 110 has been executed and the store and move instructions 111, 114, which are earlier in the instruction sequence, are unexecuted. After the load instruction 110 was sent for execution, the load instruction's dependency bit 112 was enabled and given the value of logic 0. An enabled dependency bit with the value logic 0 is referred to as a dependency bit in the "set" state.

At block 113, the move instruction 114 is executed moving the data in register E to register D. In the example illustrated, the data in register E is the data address of the load instruction 110. At block 115, the result of executing the move instruction 114 is indicated in the data address for the store instruction 111, i.e. equal to the number in register D. At block 115, it first becomes clear that a collision will occur, because the load instruction 110 has been executed before the store instruction 111 and the data addresses of the load and store instructions 110, 111 are equal. At block 117, the store instruction 111 is executed and a collision occurs. In this particular embodiment, the execution of a store instruction resets the dependency bit 112 of any executed load instruction having the same data address to the value logic 1, i.e. the value logic 1 is referred to as the "reset" state. If the load instruction 110 had been executed after the store instruction 111, the load's dependency bit 112 would not have been enabled at the time that the store instruction 111 was executed and the dependency bit would end up in the "set" state after the load instruction was subsequently executed. The dependency bit 112 of a load instruction finishes in the "reset" state if a collision actually occurred.

The retirement unit 106 checks the dependency bit 112 of an executed load instruction before retiring the instruction from the reorder buffer 94. If the dependency bit 112 is in the "set" state, the retirement unit 106 determines that no collision actually occurred and retires the instruction from the reorder buffer 94 in the instruction order as shown in block 132 of FIG. 4. If the dependency bit 112 of an executed instruction is in the "reset" state, e.g., block 118 of FIG. 5, the retirement 106 unit will determine that a collision has occurred and order the re-execution of the instruction.

Some embodiments have an additional dependency bit to indicate potential collisions as discussed in block 134 of FIG. 4. The dependency bit for potential collisions is enabled in the "set" state when a load instruction of the reorder buffer 94 is first looked up in the CHT 88. Excepting that distinction, the dependency bits for actual and potential collisions are updated similarly. The present invention is intended to include other embodiments for determining that actual or potential collisions within the knowledge of an ordinary person in the art in light of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. An apparatus, comprising:
   at least one execution unit;
   a reorder buffer for holding a plurality of instructions from an instruction sequence for execution by the execution unit, said instructions including at least one load instruction; and
   a memory storage device for holding a collision history table, the collision history table for including an entry for the load instruction, the entry for predicting whether the load instruction will collide, and wherein the entry comprises one or more bits for a predicted collision distance, said predicted collision distance representing how far the load instruction can be advanced for said execution without leading to a collision.

2. The apparatus as set forth in claim 1, wherein the entry predicts that the load instruction will collide in response to the load instruction having been, at an earlier time, executed in advance of an unexecuted store instruction, the store instruction having subsequently stored data to an address that the load instruction loaded data from and the store instruction was earlier in the instruction sequence.

3. The apparatus as set forth in claim 1, further comprising a control unit, the control unit advancing the execution of the load instruction ahead of a store instruction that is earlier in the instruction sequence in response to the entry for the load instruction not predicting a collision.

4. The apparatus as set forth in claim 1, wherein the entry further comprises a predictor bit, the entry predicting that the load instruction will collide in response to the particular predictor bit being in a first state and the table predicting that the load instruction will not collide in response to the predictor bit associated being in a second state.

5. The apparatus as set forth in claim 4, wherein the predictor bit is a sticky bit.

6. The apparatus as set forth in claim 4, wherein the particular predictor bit is a saturating counter.

7. The apparatus as set forth in claim 1, wherein the reorder buffer has at least one dependency bit linked with the load instruction held therein, the dependency status bit for indicating whether the load instruction was executed after a second instruction, the load instruction being dependent upon the second instruction.

8. The apparatus as set forth in claim 1, wherein said predicted collision distance is derived from the number of earlier said instructions that said execution of the load instruction may precede.

9. The apparatus as set forth in claim 4, wherein the entry further comprises a tag indicating the linear instruction pointer of the associated load instruction in the instruction sequence.

10. The apparatus as set forth in claim 2, further comprising a retirement unit for retiring executed instructions from the reorder buffer and for updating the collision history table in response to the executed instructions being the load instruction and having a collision.

11. The apparatus as set forth in claim 10, wherein each of the entry in the collision history table includes at least one dependency bit and the retirement determines whether the executed load instruction had a collision by reading the dependency bit associated with the executed load instruction.

12. A method of executing instructions in a processor, comprising:
    looking up a load instruction in a collision history table, the collision history table providing a prediction of when the load instruction will collide with a prior store instruction as determined by a distance indicated by one or more distance bits associated with the load instruction in an instruction sequence; and
    sending the particular load instruction to an execution unit before a store instruction that is earlier in the instruction sequence order when the collision history table predicts that the load instruction will not collide.

13. The method as set forth in claim 12, further comprising updating the collision history table when the load instruction was sent for execution before the store instruction and the store instruction collided with the load instruction, the updated collision history table predicting that the load instruction will collide.

14. The method as set forth in claim 13, wherein the step of updating adds a new entry to the collision history table when no entry of the collision history table corresponds to the load instruction prior to the step of updating.

15. The method as set forth in claim 13, wherein said step of updating comprises setting a predictor bit for the particular load instruction to a first value and wherein said step of looking up predicts that the load instruction will collide when the predictor bit has the first value.

16. The method as set forth in claim 13, wherein said step of looking up predicts that the load instruction will collide when executed before a prior store instruction that is ahead of the instruction by said distance and wherein the step of updating further comprises resetting the distance bits to a new value when the instruction collides with a prior store instruction and a distance between the load and prior store instructions is less than the distance indicated by the distance bits.

17. The method as set forth in claim 12, wherein the step of looking up comprises searching for a tag for the load instruction in the collision history table, the tag being the instruction pointer for the load instruction.

18. The method as set forth in claim 12, further comprising:
re-executing the load instruction in response to the load instruction having been sent for execution and subsequently colliding with the prior store instruction; and
then, re-executing any instruction dependent on the load instruction in response to the dependent instruction having been sent for execution prior to the re-execution of the load instruction.

19. The method as set forth in claim 12, wherein said steps of looking up and sending are performed by a controller.

20. A processor comprising:
a reorder buffer for holding a plurality of instructions of an instruction sequence;
a collision history table, the table having entries for a plurality of load instructions and predicting when one of the load instructions will collide as determined by a distance indicated by one or more distance bits associated with said load instruction;
a controller for sending the instructions of the reorder buffer for execution, and for not sending a particular load instruction of the reorder buffer for execution when the collision history table predicts that the particular load instruction will collide; and
a retirement unit for removing executed instructions from the reorder buffer, the retirement unit for updating the collision history table to predict that the executed instruction will collide in response to the executed instruction being a load instruction and having collided, the retirement unit capable of setting the executed instruction for re-execution when the executed instruction has collided.

21. The processor as set forth in claim 20, wherein a particular entry of the table comprises a predictor bit, the predictor bit having first and second states, the first state indicating that the collision history table will predict that the particular load instruction will collide.

22. The processor as set forth in claim 21, wherein the predictor bits is a sticky bit.

23. The processor as set forth in claim 21, wherein the predictor bit may be reset to one of the second states after the particular load instruction was predicted to collide and did not collide, and wherein the table predicts that the particular load instruction will not collide when the predictor bit is in one of said second states.

24. The processor as set forth in claim 21, wherein the particular load instruction has a particular entry in said collision history table associated thereto only when said collision history table is capable of predicts that the particular load instruction will collide.

25. The processor as set forth in claim 21, wherein said distance represents a prediction of how far the particular load instruction may be executed before the particular load instruction's place in the instruction sequence without colliding.

26. The processor as set forth in claim 25, wherein said particular distance is less than the actual distance between the particular load instruction and an old store instruction at an earlier time, wherein the old store instruction and the particular load instruction collided at the earlier time.

27. The processor as set forth in claim 21, wherein each entry in the collision history table comprises a tag selected from the group consisting of a linear instruction pointer of the load instruction associated with the existing entry or a portion of the bits of the linear instruction pointer of the load instruction associated with the existing entry, and wherein said controller is adapted to finding the existing entry associated with the particular load instruction by searching the tags of the collision history table.

28. The processor as set forth in claim 20, wherein the collision history table includes a memory storage device connected to the controller and readable by the retirement unit.

\* \* \* \* \*